(No Model.)
B. HOLT.
THRASHING MACHINE.
No. 420,512. Patented Feb. 4, 1890.
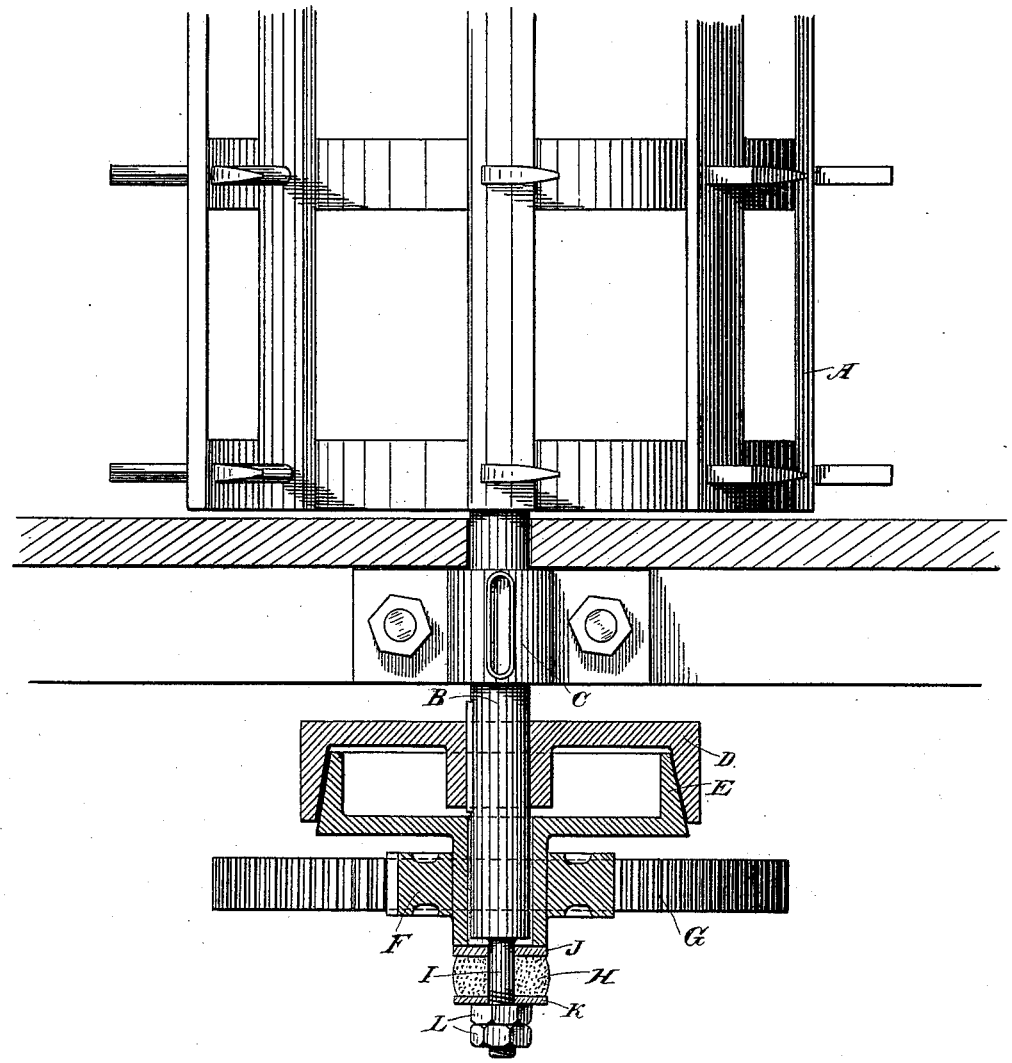
Witnesses,
Geo. H. Strong.
B. K. Krouse
Inventor,
Benjamin Holt
By Dewey & Co
atty

UNITED STATES PATENT OFFICE.

BENJAMIN HOLT, OF STOCKTON, CALIFORNIA.

THRASHING-MACHINE.

SPECIFICATION forming part of Letters Patent No. 420,512, dated February 4, 1890.

Application filed August 21, 1889. Serial No. 321,515. (No model.)

*To all whom it may concern:*

Be it known that I, BENJAMIN HOLT, of Stockton, San Joaquin county, State of California, have invented an Improvement in Thrashing-Machines; and I hereby declare the following to be a full, clear, and exact description of the same.

My invention relates to certain improvements in thrashing-machines; and it consists in the application to the shaft of the thrashing-cylinder of a frictional clutch mechanism intermediate between the cylinder-shaft and the driving-gearing with its frictional surfaces normally held together, so that in case of any sudden stoppage or check in the motion of the cylinder this intermediate clutch will slip sufficiently to relieve the driving-gears and prevent their breaking.

Referring to the accompanying drawing for a more complete explanation of my invention, the figure is a top or plan view showing a part of one end of a thrashing-cylinder, its shaft, and journal-box, and a part of the driving-gear, with my invention attached.

A is the cylinder of a thrashing-machine, having the shaft B turning in journal-boxes at each end, one of which I have shown at C. Upon this shaft is fixed the one portion D of a friction-clutch which I have shown in the present case to illustrate my invention. The other portion E of this clutch has its hub extended, and the pinion F is either keyed to this hub, or, if desired, may be formed as a part thereof.

G is a gear-wheel, the teeth of which engage those of the pinion F, and through this motion is transmitted to drive the pinion and that portion E of the clutch which is connected with it.

It will be manifest that when the two parts D and E of the clutch are forced together, which is their normal position, so as to produce a sufficient frictional contact, the power will be transmitted through them to drive the cylinder; but if by any reason the cylinder should be suddenly checked—as by the introduction of a heavy mass of straw or weeds, or by the breaking of a tooth, or the accidental falling into the cylinder of some part of the machine—it will be manifest that the frictional contact of the clutch D E will be overcome to such an extent as to allow the gearing to continue its motion until the machine can be stopped and the difficulty corrected.

In order to produce a proper frictional contact between the parts D and E, I have shown an elastic cushion or spring H surrounding the extension I of the shaft B, which is made of smaller diameter, as shown. This cushion or spring is retained between the washers J and K, and the lock-nuts L, screwing upon the outer end of this extension-shaft, enables me to adjust the tension of the spring H, so as to produce any desired frictional contact between the parts D and E of the clutch.

In practice it is found that from sixty to eighty pounds are sufficient—that is, that a force of from sixty to eighty pounds exerted upon the stationary cylinder when the parts are at rest would suffice to slip the parts of the clutch; and I have found that with this power, when the device is used upon combined traveling harvesters, the cylinder will be rotated with sufficient power to do the work; but if heavy grain or weeds are carried in, or any strain comes upon the cylinder which would ordinarily tend to break the pinion or gear-teeth, the clutch will slip and relieve the latter.

It will be manifest that any suitable friction-clutch may be employed. I do not limit myself to or claim, broadly, any particular form of clutch alone.

Having thus described my invention, what I claim as new, and desire to secure by Letters Patent, is—

In a thrashing-machine, the combination of the thrashing-cylinder fixed upon a shaft journaled on the frame-work of the machine, a driving-gear turning loosely upon said shaft, intermediate disks having smooth conical contact-surfaces, one being keyed fast to the shaft and the other having a sleeve upon which the driving-gear is fixed, a continuation of smaller diameter at the end of the shaft, an elastic spring surrounding said continuation and pressing against the sleeve of the disk, collars between which the spring is retained, and nuts upon the end by which the tension of the spring is regulated, substantially as herein described.

In witness whereof I have hereunto set my hand.

BENJAMIN HOLT.

Witnesses:
GEO. H. COWIE,
ALBERT HEALEY.